(12) United States Patent
Laun

(10) Patent No.: US 7,061,387 B2
(45) Date of Patent: Jun. 13, 2006

(54) MEASUREMENT INSTRUMENT, ESPECIALLY FOR LEVEL OR PRESSURE MEASUREMENT WITH SPEECH ASSISTANCE

(75) Inventor: Robert Laun, Hausach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 10/837,603

(22) Filed: May 4, 2004

(65) Prior Publication Data

US 2005/0001713 A1   Jan. 6, 2005

(30) Foreign Application Priority Data

May 15, 2003   (DE) .................. 103 21 775

(51) Int. Cl.
*G08B 21/00* (2006.01)

(52) U.S. Cl. .............. 340/612; 73/658; 340/614; 340/618; 340/626

(58) Field of Classification Search ........ 340/540, 340/500, 539.1, 539.11, 612, 614, 618, 626, 340/815.4, 384.1, 384.5; 73/592, 658, 661, 73/660, 593; 33/784, 819
See application file for complete search history.

(56) References Cited

U.S. PATENT DOCUMENTS

| 4,558,707 | A | * | 12/1985 | Miyamae et al. | ........ 600/496 |
| 4,563,770 | A | * | 1/1986 | Lemelson et al. | ........ 704/270 |
| 4,694,694 | A | * | 9/1987 | Vlakancic et al. | ........ 73/386 |
| 4,749,553 | A | * | 6/1988 | Lopez et al. | ........ 422/84 |
| 5,181,521 | A | * | 1/1993 | Lemelson | ........ 600/549 |
| 5,337,488 | A | * | 8/1994 | Lemelson | ........ 33/784 |
| 5,496,257 | A | * | 3/1996 | Kelly | ........ 601/41 |
| 5,690,277 | A |   | 11/1997 | Flood | ........ 236/94 |
| 6,216,539 | B1 |   | 4/2001 | Johnson et al. | ........ 73/592 |
| 6,826,532 | B1 | * | 11/2004 | Casby et al. | ........ 704/270 |
| 6,836,972 | B1 | * | 1/2005 | Drahos et al. | ........ 33/366.11 |
| 6,901,792 | B1 | * | 6/2005 | Petrucelli | ........ 73/146 |

FOREIGN PATENT DOCUMENTS

| DE | 3010241 C2 | 9/1980 |
| DE | 4039 214 A1 | 8/1991 |
| DE | 196 39 561 A1 | 4/1998 |
| DE | 201 02 601 U1 | 5/2001 |
| DE | 694 27 640 T2 | 5/2002 |
| DE | 101 10 490 A1 | 9/2002 |
| DE | 101 47 706 A1 | 4/2003 |
| EP | 0 913 674 A1 | 5/1999 |
| EP | 1 172 651 A1 | 1/2002 |
| GB | 2 267 586 A | 12/1993 |

* cited by examiner

*Primary Examiner*—Brent A. Swarthout
(74) *Attorney, Agent, or Firm*—Nath & Associates PLLC; Gregory B. Kang; Teresa M. Arroyo

(57) ABSTRACT

The invention relates to a measurement instrument, especially for level and pressure measurement with a controller (9), which is connected to a memory unit (8), an input unit (11), and also an output unit (12). Here, the output unit (12) is embodied as an acoustic output unit. According to the invention, operator and/or operating parameters are stored in the memory unit (8) and can be output as audible speech signals from the output unit (12) by activating the input unit (11).

9 Claims, 2 Drawing Sheets

Figure 1:
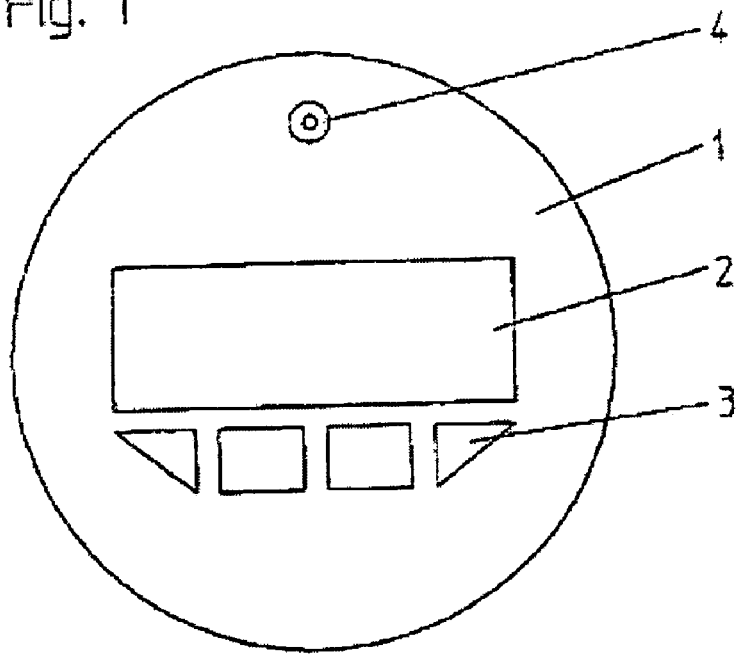

MEASUREMENT INSTRUMENT, ESPECIALLY FOR LEVEL OR PRESSURE MEASUREMENT WITH SPEECH ASSISTANCE

The invention relates to a measurement instrument, especially a level or pressure measurement instrument according to the preamble of Claim 1.

Such level measurement instruments are sold, e.g., under the name VEGAFLEX series 60 by the applicant. Pressure measurement instruments are sold by the applicant under the name VEGABAR.

Level measurement instruments and pressure measurement instruments, such as pressure measurement instruments, vibration measurement instruments, etc., usually require some information that must be reported to the level measurement instrument by the user for the instrument to function correctly. This information can be, e.g., on the one hand, an equalization, which converts the measured physical parameter into a parameter desired by the user (e.g., from meters into volume percent) or on the other hand, parameters, which report the environmental conditions, in which the instrument is used, to the level measurement instrument (e.g., the filling material in the container).

Until now, this information has been input either by means of a PC, which is equipped with suitable software or which must be connected to the level measurement instrument, or by means of buttons located on the level measurement instrument supported by a display 2 that is also provided on the level measurement instrument. However, the size of the display 2 in the latter variant is limited as a condition of the structural size of the measurement instrument, so that the display must be limited to essential information, e.g., the parameters to be set. Context-related auxiliary functions for the menu visible in display 2 thus cannot be displayed on the same display 2, with the result that this information must be taken from a separate, printed operating manual enclosed with the measurement instrument.

According to this invention, in practice this situation represents a problem, because the operating manual is not always to be found in the immediate vicinity of the level measurement instrument.

The present invention begins here.

The goal of the invention is to make a separate operating manual for the start-up of a measurement instrument unnecessary and nevertheless still to provide the user with information on the operator and operating parameters during the parameterization of the measurement instrument.

This goal is realized according to the invention by the features mentioned in Claim 1.

By means of a loudspeaker and/or headphones 7, the user receives audible assistance in the form of speech signals, which give information on operator or operating parameters, so that detailed visual representation, as well as context-related auxiliary functions in the display 2 of the level measurement instrument, can be eliminated. Furthermore, an operating manual enclosed with the measurement instrument is no longer absolutely necessary. Nevertheless, the user is in the position to operate the measurement instrument in a qualified way. The use of a measurement instrument according to the invention is intended especially for situations in which the measurement instrument can be accessed only with difficulty (e.g., on silos). In such situations, the user must dedicate more attention to his safety or he is fitted with corresponding instrument poles, which make carrying along an operating manual, as well as finding corresponding passages in this manual, impossible.

Refinements of the invention are the object of the subordinate claims.

In one especially advantageous configuration of the invention, there is a first transmitting and receiving unit 5 for the wireless transmission of the audible speech signals to the output device 12. Therefore, cables, e.g., to headphones 7, which were often found to be a nuisance to the user, because they could sometimes considerably restrict his freedom of movement, can be eliminated.

A preferred field of application of the invention includes level or pressure measurement instruments.

Figure 2:
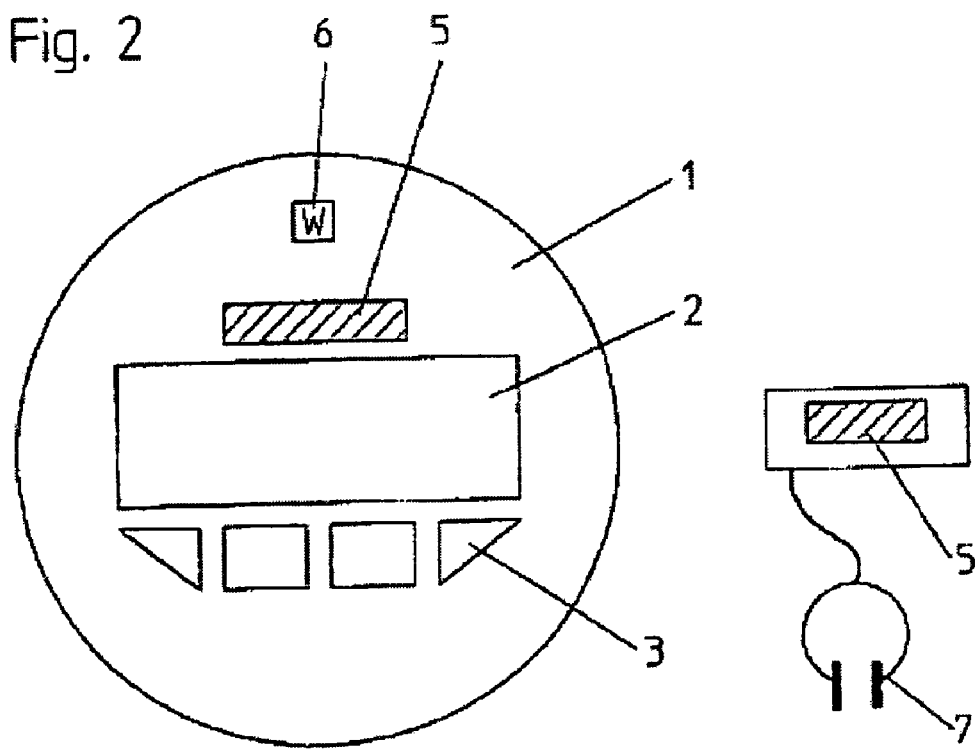
Figure 3:
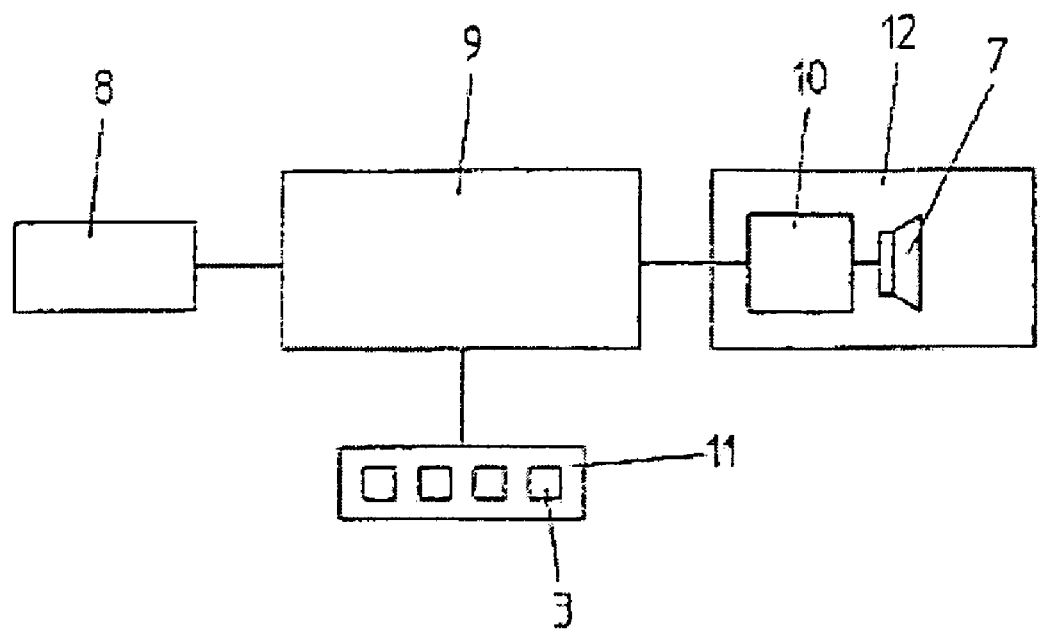
Figure 4:
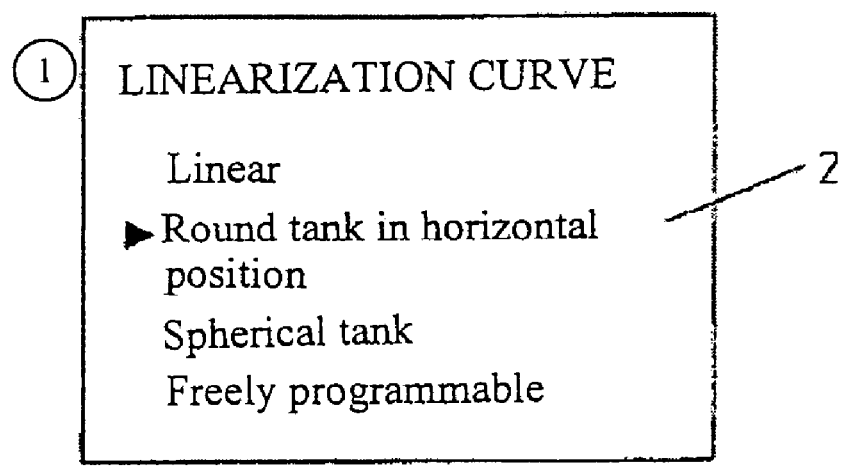

The invention and its other preferred configurations are described in more detail in the following in connection with an embodiment with reference to several figures. Shown are:

FIG. 1, top view of a level measurement instrument from the VEGAFLEX series 60, expanded by the possibility of connecting headphones or a loudspeaker 7, FIG. 2, top view of a level measurement instrument from the VEGAFLEX series 60, expanded by an interface 5 for wireless transmission of the audible signals to a receiver device with headphones 7 and also a repeat button 6, FIG. 3, block circuit diagram of a level measurement instrument according to the invention, and FIG. 4, section from the menu shown in display 2.

Unless otherwise indicated, the same reference symbols designate equivalent parts with equivalent meaning in the following figures.

FIG. 1 shows a top view of a level measurement instrument. In the middle of the housing cover 1 of the level measurement instrument, which is, e.g., round, there is a display 2; directly underneath this part are the input buttons 3. These buttons permit the user to input the information necessary for correct functioning of the level measurement instrument supported visually by the display 2. Above the display 2 is a socket 4 to which headphones or a loudspeaker 7 can be attached. By means of these headphones or loudspeaker 7, audible speech signals, which make it easier for the user to carry out the input by means of the input buttons 3, are transmitted to the user.

FIG. 2 shows a somewhat different configuration of the level measurement instrument, which is essentially oriented, however, to the variant shown in FIG. 1. One difference is the expansion of the input buttons 3 by a repeat button 6, which can be pressed to repeat the last audible speech signal. This function is important because under some circumstances the field of application of this level measurement instrument can lead to increased noise effects. Another difference is the built-in interface 5, by means of which the wireless, audible signals can be received, e.g., by headphones. For the wireless transmission of audible signals, infrared or Bluetooth® technology can be used. A corresponding receiver part, which was shown as a separate unit in FIG. 2 for reasons of easier illustration, is found on the headphones 7.

FIG. 3 shows the schematic setup of the level measurement instrument. The central component is a microprocessor 9 as a controller. Attached to this are an input unit 11 in the form of input buttons 3 and an output unit 12 in the form of a digital-to-analog converter 10 connected to a loudspeaker 7. The speech signals are stored in several regions of a memory unit 8. By using several regions, it is possible to output the speech signals in several languages, as well as in different levels of detail.

If the level measurement instrument is mounted on a container whose level is to be measured, the user reports information that is necessary for exact measurement, e.g., what type of filling material is in the container, to the measurement instrument by means of the input buttons 3. To perform this data input, the user must find the correct menu item with which he can perform his input, by means of a menu that is visible on the display 2. Now, during the operation the user receives explanations on the menu shown on the display 2 and/or the steps to be completed, such as the possible button presses, through speech commands.

FIG. 4 shows a section from the menu visible in display 2. If the user reaches this point, he could hear, e.g., the following spoken text: "Linearization curve—The linearization curve calculates a volume-proportional percentage from the height-proportional percentage. If the 100% calibration agrees with the top edge of the container and the 0% calibration agrees with the bottom edge of the container, you can use the predefined curves of a round tank lying in a horizontal position or a spherical tank. If not, under 'freely programmable' you can input a matching curve.—To set a different value, press OK."

LIST OF REFERENCE SYMBOLS

1 Housing cover
2 Display
3 Input buttons
4 Socket for connecting headphones
5 Interface for wireless signal transmission
6 Repeat button
7 Loudspeaker/headphones
8 Memory unit
9 Controller (microprocessor)
10 D/A converter
11 Input unit
12 Output unit

The invention claimed is:

1. Level measurement instrument, comprising:
a controller (9), which is connected to a memory unit (8), an input unit (11), and an output unit (12),
whereby the output unit (12) is embodied as an acoustic output unit; and
at least one of operator and operating parameters of an operating manual, which can be output from the output unit (12) during parameterization of said instrument as audible speech signals by activating the input unit (11), are stored in the memory unit (8), and
whereby a button (6) is contained in the periphery of the controller (9) and when the button is pressed, the audible speech signals are repeated after their output.

2. Level measurement instrument according to claim 1, characterized in that the memory unit (8) contains at least two regions, wherein the audible speech signals are stored coded in analog or digital form in a different language in each region.

3. Level measurement instrument according to claim 1, characterized in that the output of the audible speech signals can be changed in terms of the volume, timbre, and pitch.

4. Level measurement instrument according to claim 1, characterized in that a plug connection (4) is provided, to which headphones or a loudspeaker can be connected.

5. Level measurement instrument according to claim 1, characterized in that a first transmitting and receiving unit (5) for the wireless transmission of audible speech signals is provided for the output unit (12).

6. Level measurement instrument according to claim 1, characterized in that a display (2) is present, which visually outputs at least part of the at least one of operator and operating parameters of the audible speech signals.

7. Level measurement instrument according to claim 1, characterized in that a processing unit is provided, which converts the parameters from one measured physical parameter to another.

8. Level measurement instrument according to claim 7, characterized in that a transmitting and receiving unit is provided for transmitting the measured physical parameters to a data collection unit.

9. Level measurement instrument according to claim 1, characterized in that the level of detail of the audible speech signals for the at least one of operator and operating parameters can be selected in steps.

* * * * *